United States Patent Office 3,434,368
Patented Mar. 25, 1969

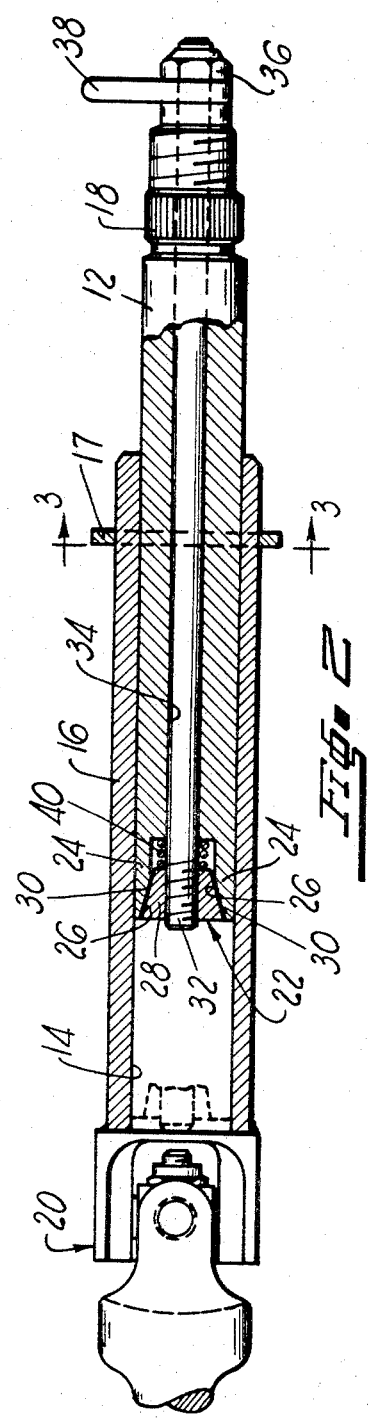
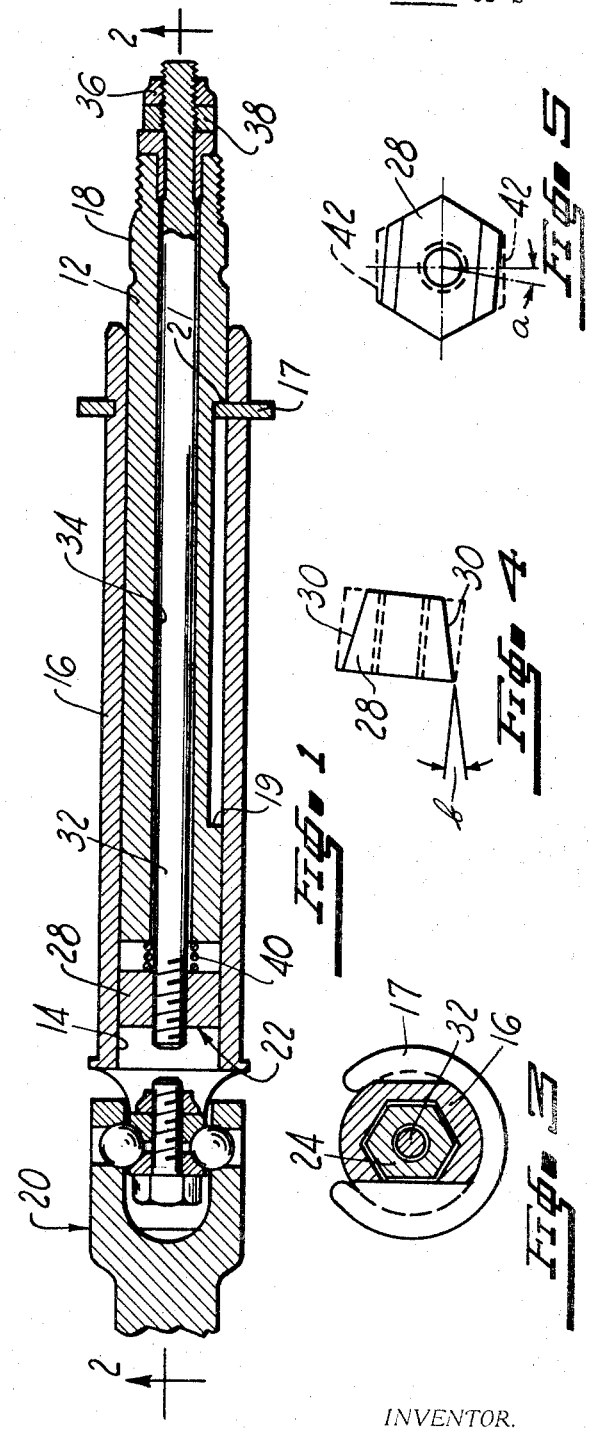

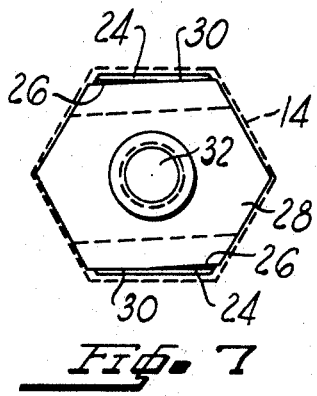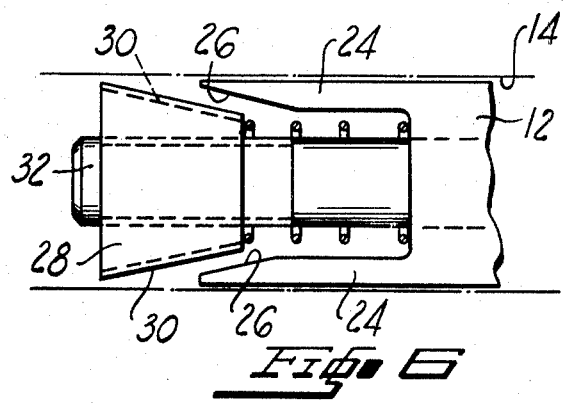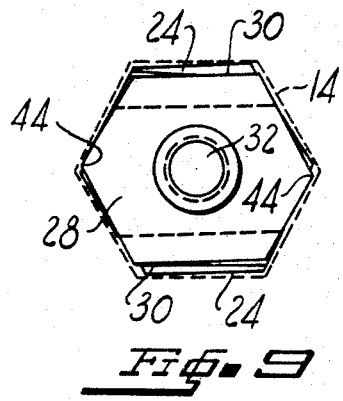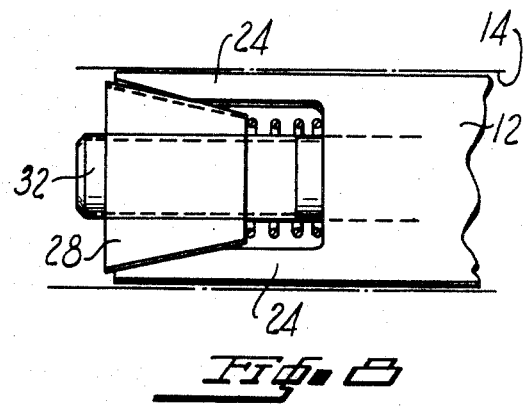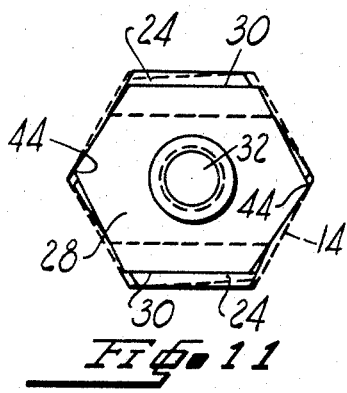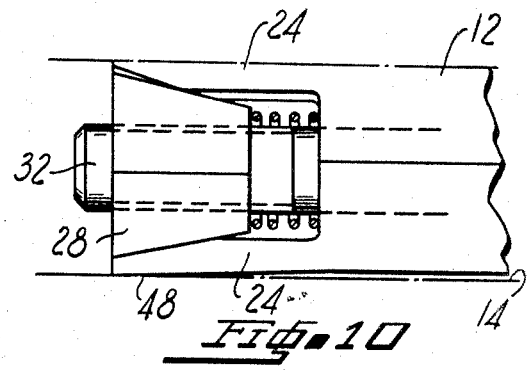

3,434,368
NO-LASH AXIALLY MOVABLE STEERING
COLUMN
Dean E. Runkle, South Bend, Ind., assignor to The Bendix
Corporation, a corporation of Delaware
Filed Mar. 10, 1967, Ser. No. 622,241
Int. Cl. B62d 1/18
U.S. Cl. 74—493                                10 Claims

ABSTRACT OF THE DISCLOSURE

A steering column arrangement having two telescoping shafts and a device for eliminating lost motion or "lash" therebetween. The device includes an axially movable wedge-like member having angular wedge surfaces formed thereon which are skewed with respect to and engage mating angular wedge surfaces formed on one of the telescoping shafts so that axial movement of the wedge-like member will cause rotation and continuous frictional engagement of one of the shafts with respect to the other.

Background of the invention

In the past most vehicles contained an adjustable driver's seat so that the most comfortable position relative to the accelerator, brake, or other control pedals could be attained by the driver, as determined by the length of the driver's legs. However, if the steering column could not also be adjusted, the position of the steering wheel, more often than not, was not satisfactory. Thus, if a short driver adjusted the seat to a forward position so that the control pedals could be reached, the steering wheel probably was too close to the driver's body and probably even touched it. On the other hand, a tall driver who had moved the seat rearwardly probably found that the steering wheel was too far away for comfort.

In order to eliminate the foregoing problems, vehicle manufacturers, in some instances, have made available axially and angularly adjustable steering columns which can be positioned relative to the driver's seat so that any normal driver regardless of his girth, size, or height, will be comfortable and will have full control of the vehicle.

In my copending patent application, Ser. No. 477,537, filed Aug. 5, 1965, now Patent No. 3,318,170 I have disclosed and claimed an axially movable steering column which includes mechanism for eliminating torsional lost motion, commonly referred to as "lash," between the axially movable components of the steering column. The instant novel device is intended to accomplish the same end, but in an improved manner.

Summary of the invention

Accordingly, it is an object of this invention to provide, in an axially movable steering column having inner and outer telescoped shafts which are axially movable with respect to each other, an axially movable member operatively connected to said shafts for causing rotation and continuous frictional engagement of one of said shafts with respect to the other of said shafts to thereby eliminate torsional lash therebetween, said axially movable member being located at one end of the inner telescoped shaft and within the bore of the outer telescoped shaft.

More specifically, it is an object of this invention to provide in an axially movable steering column of the type described, a first shaft having a polygonal shape and a second shaft having a corresponding polygonal bore therein for receiving said first shaft, a plurality of tangs extending from one end of said first shaft, each of which has an angular wedge surface on the inner face thereof, an axially disposed polygonal wedge-like member located between said tangs and having angular wedge surfaces thereon for engagement with the wedge surfaces of said tangs, said contacting wedge surfaces of said tangs and member being skewed with respect to each other, and means for causing axial movement of said member towards the other end of said first shaft and into engagement with said tangs, said axial movement causing rotation and continuous frictional engagement of one of said shafts with respect to the other of said shafts to thereby eliminate torsional lash therebetween.

A further object of this invention is to provide a mechanism of the type described for eliminating torsional lash between the axially movable shafts of the steering column which is easier to fabricate and is less expensive than heretofore known comparable mechanisms.

Other objects and features of the invention will be apparent from the following description of the mechanism taken in connection with the accompanying drawings.

Brief description of the drawings

FIGURE 1 is a sectional view of a portion of a steering column of a vehicle showing the axially movable components thereof and the mechanism incorporating the invention;

FIGURE 2 is a sectional view taken along line 2—2 of FIGURE 1, with the steering column shown in a partially extended position;

FIGURE 3 is a sectional view taken along line 3—3 of FIGURE 2;

FIGURES 4 and 5 show a plan view and an end view, respectively, of the hexagonal wedge member having oppositely disposed angular wedge surfaces formed thereon.

FIGURES 6 and 7 show an enlarged somewhat exaggerated schematic plan view and end view of the invention with the wedge in a disengaged position;

FIGURES 8 and 9 show similar schematic plan and end views with the wedge engaged and drawn snug; and FIGURES 10 and 11 show similar schematic plan and end views with the wedge engaged and drawn tight.

Description of the preferred embodiment

Referring to FIGURES 1, 2, and 3, it will be seen that an axially movable shaft 12 having a hexagonal shape is located in a corresponding hexagonal bore 14 formed in a shaft 16. Shaft 12 is suitably connected at 18 to the steering wheel (not shown) of a vehicle, whereas shaft 16 is suitably connected to the steering gear (not shown) of the vehicle through means of a universal joint, indicated generally by the numeral 20. Details of this universal joint are disclosed in my U.S. Patent No. 3,296,830, issued Jan. 10, 1967. By telescoping shaft 12 within shaft 16, it will be apparent that axial adjustment of the vehicle steering wheel can be accomplished simply by pushing or pulling on the steering wheel. Furthermore, in the event of an accident, injury to the driver will be minimized because the steering column can telescope upon impact. The amount of relative axial movement between shafts 12 and 16 is limited by contact of C-washer 17 which is fixedly connected to shaft 16, with shoulders 19 and 21 formed on shaft 12.

Since it is impractical from a tolerance standpoint to make the telescoping shafts 12 and 16 lash free, a mechanism indicated generally by the numeral 22 is utilized to maintain the two shafts in continuous frictional engagement at all times. The mechanism includes two oppositely disposed tangs 24 extending from one end of the shaft 12, each of which has an angular wedge surface 26 formed on the inner face thereof. A hexagonally shaped wedge-like member 28 which is located between the tangs 24, is formed with oppositely disposed angular wedge surfaces 30 for engagement with the wedge surfaces 26 of the tangs 24. It will be noted that the tangs and the wedge-like member in conjunction form a hexagonal shape corresponding to the hexagonal shape of shaft 12 and the hexagonal bore 14 of shaft 16. The wedge 26 is threaded to the end of an adjusting rod 32 which is located in a bore 34 extending through shaft 12. A nut 36 is suitably threaded to the other end of the rod and retains a manually operated lever 38 which is fixedly connected to the rod so that manual rotation of lever 38 and rod 32 will cause axial movement of said wedge. Thus, rotation of the rod in a clockwise direction will cause the wedge to move axially towards compression spring 40, whereas rotation of the rod in a counterclockwise direction will permit the wedge to be moved in a direction axially away from spring 40.

Referring to FIGURES 4 and 5, it will be seen that the wedge-like member 28 is formed from hexagonally shaped stock which is dimensionally the same as hexagonal shaft 12. However, two of the hexagonal flats 42 are machined at an angle $b$ to form wedge planes or surfaces 30. In addition these wedge planes 30 are machined at an angle $a$ away from the basic hexagonal shape so that the contacting wedge surfaces of the tangs 24 and the wedge surfaces 30 of the wedge 28 are skewed with respect to each other. It will be understood that, although the drawing shows wedge surfacse 30 of the wedge as being skewed with respect to the symmetrical wedge surfaces 26 of the tangs, the wedge surfaces 26 of the tangs could, if desired, be skewed with respect to symmetrical wedge surfaces 30 on the wedge. Thus, it will be apparent that the only important feature, insofar as the contacting wedge surfaces are concerned is that the contacting wedge surfaces are skewed with respect to each other.

The operation of the mechanism is more clearly shown in FIGURES 6–11, wherein the clearances and angular relationships between the components are exaggerated for clarity. Thus, with the wedge 28 in a disengaged position, as shown in FIGURE 6, the relative positions of the components will be as shown in the end view of FIGURE 7. It will be noted that all surfaces are substantially symmetrical and parallel except for the angular wedge surfaces 26 formed on the tangs 24 and the angular wedge surfaces 30 formed on the wedge-like member 28 which are skewed with respect to each other. Upon rotation of the lever 38 and rod 32 the wedge-like member 28 initially will be drawn towards the tangs 24 into a snug engagement therewith, as shown in FIGURES 8 and 9. Upon engagement of the skewed angular wedge surfaces 30 of the wedge 28 with the angular wedge surfaces 26 of the tangs 24 the wedge 28 will be caused to rotate in a clockwise direction until the corners 44 thereof engage the walls of the bore 14 of shaft 16. Such engagement of the corners with the bore walls provide the necessary reaction points for causing rotation of inner shaft 12 in a counterclockwise direction relative to shaft 16 until shaft 12 is rotated into frictional engagement with shaft 16. Such engagement between the shafts, as is more clearly shown in FIGURES 10 and 11, will eliminate all torsional lash therebetween. In addition to the relative rotation and consequent engagement between the two telescoping shafts which occurs when the wedge 28 is drawn tightly against the tangs 24, such axial movement of the wedge will also tend to spread the tangs apart and also cause engagement of the tangs with the wall of the bore 14, as shown in FIGURE 10 by numeral 48.

The several practical advantages which flow from this type of an adjustable steering column arrangement are believed to be obvious from the above, and other advantages may suggest themselves to those who are familiar with the art to which this invention relates.

Furthermore, although this invention has been described in connection with a specific embodiment, it will be obvious to those skilled in the art that various changes may be made in the form, structure, and arrangement of parts without departing from the spirit of the invention. For example, shafts having polygonal shapes and corresponding bores other than hexagonal would be suitable in the practice of this invention. Furthermore, if desired, a single pair of contacting skewed angular wedge surfaces, instead of a plurality of contacting skewed angular wedge surfaces, as shown, could be utilized to cause rotation of one of the telescoping shafts with respect to the other.

Having thus described the various features of the invention, what I claim as new and desire to secure by Letters Patent is:

1. An axially movable steering column comprising first and second shafts, one of which is axially movable with respect to the other of said shafts, said first shaft having a polygoial shape and said second shaft having a corresponding polygonal bore therein for receiving said first shaft, and axially movable means operatively connected to said first and second shafts for causing rotation and continuous frictional engagement of one of said shafts with respect to the other of said shafts upon axial movement of said means to thereby eliminate torsional lash therebetween, said axially movable means being located at one end of said first shaft and within the bore of said second shaft for engagement with said first shaft.

2. An axially movable steering column, as defined in claim 1, wherein said first shaft includes angular wedge surface located at said one end thereof, and said axially movable means includes mating angular wedge surface means for engagement with the wedge surface means of said first shaft, said wedge surface means of said first shaft and said movable means being skewed with respect to each other.

3. An axially movable steering column, as defined in claim 2, wherein the angular wedge surface means located at said one end of said first shaft is formed on tang means extending from said first shaft, and said axially movable means comprises a polygonal wedge-like member, having said mating angular wedge surface means formed thereon.

4. An axially movable steering column, as defined in claim 3, wherein manually operable means is operatively connected to said polygonal wedge-like member to cause axial movement thereof.

5. An axially movable steering column comprising first and second shafts, one of which is axially movable with respect to the other of said shafts, said first shaft having a polygonal shape and said second shaft having a corresponding polygonal bore therein for receiving said first shaft, a plurality of tangs extending from one end of said first shaft, each of which has an angular wedge surface on the inner face thereof, an axially disposed polygonal wedge-like member located between said tangs and having angular wedge surfaces thereon for engagement with the wedge surfaces of said tangs, said contacting wedge surfaces of said tangs and member being skewed with respect to each other, and means for causing axial movement of said member towards the other end of said first shaft and into engagement with said tangs, said axial movement causing rotation and continuous frictional engagement of one of said shafts with respect to the other of said shafts to thereby eliminate torsional lash therebetween.

6. An axially movable steering column, as defined in claim 5, wherein said tangs and wedge-like member in conjunction form a polygonal shape corresponding to the polygonal shape of said first shaft and the polygonal bore of said second shaft.

7. An axially movable steering column, as defined in claim 6, wherein said plurality of tangs includes only two oppositely disposed tangs.

8. An axially movable steering column, as defined in claim 7, wherein said first shaft includes a bore extending therethrough, and said means for causing axial movement of said wedge-like member includes an adjusting rod extending through said bore of said first shaft, said rod being in threaded engagement with said wedge-like member so that rotation of said rod will cause axial movement of said member.

9. An axially movable steering column, as defined in claim 8, wherein movement of said wedge-like member towards the other end of said first shaft is opposed by spring means operatively connected to said member and said first shaft.

10. An axially movable steering column, as defined in claim 9, wherein said first shaft is formed in the shape of a hexagon and said bore of said second shaft is formed in the shape of a corresponding hexagon.

References Cited

UNITED STATES PATENTS 973,806 10/1910 Noble.
3,188,880 6/1965 Caine _____ 74—493

MILTON KAUFMAN, *Primary Examiner.*

U.S. Cl. X.R.

74—531; 287—58